J. STEWART.
PULLEY.
APPLICATION FILED JAN. 20, 1912. RENEWED NOV. 12, 1917.
1,255,661.
Patented Feb. 5, 1918.
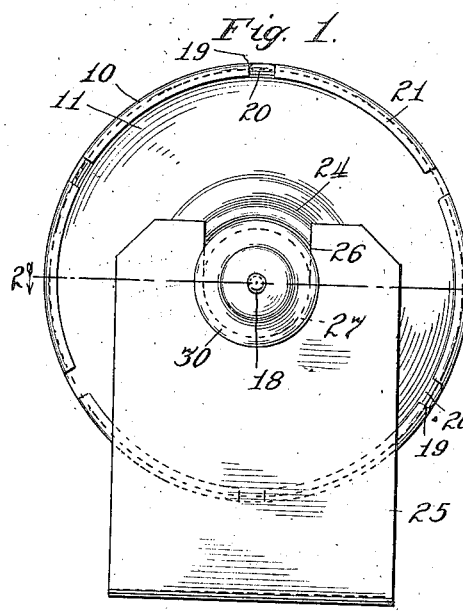
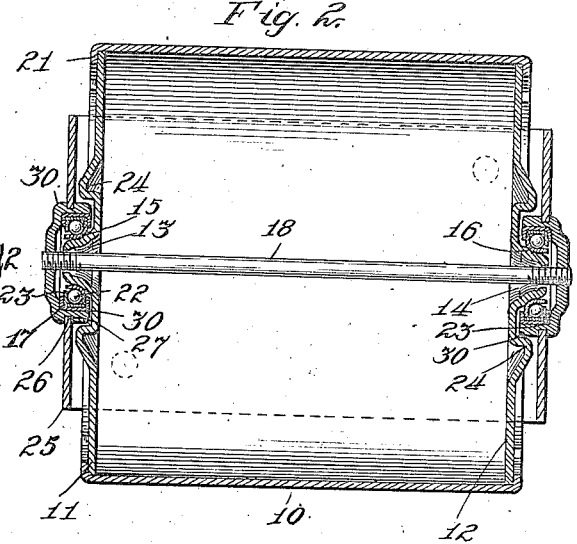
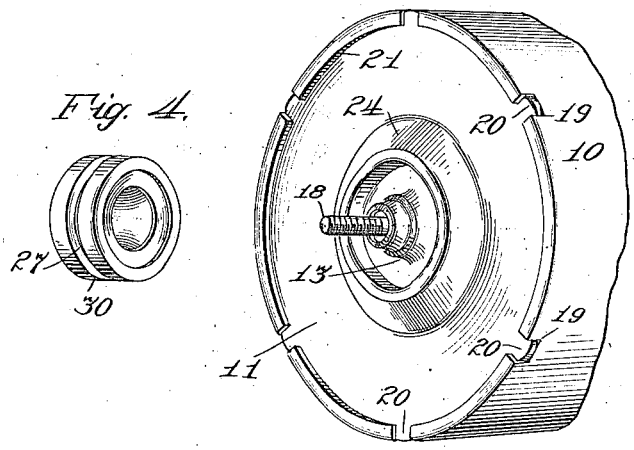
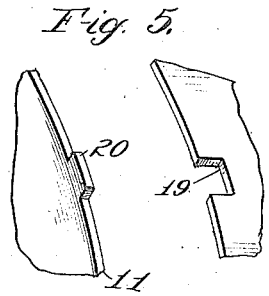
Witnesses
Milton Lenoir
E. M. Klatcher
Inventor
John Stewart.
By Gibson & Gibson
Attorneys.

UNITED STATES PATENT OFFICE.

JOHN STEWART, OF AURORA, ILLINOIS, ASSIGNOR TO STEPHENS ADAMSON MNFG. CO., A CORPORATION OF ILLINOIS.

PULLEY.

1,255,661.      Specification of Letters Patent.      Patented Feb. 5, 1918.

Application filed January 20, 1912, Serial No. 672,446. Renewed November 12, 1917. Serial No. 201,663.

*To all whom it may concern:*

Be it known that I, JOHN STEWART, a citizen of the United States, and resident of Aurora, county of Kane, and State of Illinois, have invented certain new and useful Improvements in Pulleys, of which the following is a specification, and which are illustrated in the accompanying drawings, forming a part thereof.

The invention is particularly applicable to pulleys for use in connection with belt conveyers, though it may be applied to pulleys used in other situations.

Its objects are to provide an improved mounting for the bearings upon which the pulley rotates, and an improved means for mounting the pulley in a supporting bracket.

The invention is fully hereinafter described and is illustrated in the accompanying drawings, in which—

Figure 1 is an end view of the supporting bracket and a pulley mounted thereon;

Fig. 2 is a plan section on the line 2—2 of Fig. 1;

Fig. 3 is a detail perspective of the pulley detached from its supporting bracket;

Fig. 4 is a perspective of a ball bearing casing or shell used in connection with the pulley; and Fig. 5 is a detail in perspective of the end plate and peripheral wall of the pulley before assembling.

The pulley comprises a body portion 10, cylindrical in form and preferably of sheet metal, and ends 11, 12, which are preferably in the form of plates fitted to the ends of the cylinder, these end plates being centrally apertured and preferably being otherwise imperforate—the walls of the central apertures being drawn outwardly to form nipples or bosses, as shown at 13, 14, for receiving and holding the shell as 15, 16 of a ball bearing.

Each ball bearing in its entirety comprises as shown, the said inner shell 15 or 16 and an outer L-shaped annulus, 23, inclosing the said inner shell and with it forming a race for balls 22. An annulus 17 fits snugly around the annulus 23, and has instanding marginal flanges for holding the two elements of the shell together.

A cap 30 incloses the ball bearing, and a rod 18, located on the axis of the pulley, is in threaded engagement with the cap 30 of the two ball bearing casings and ties them together.

The inner annulus as 15, 16 of the ball bearing casing is of such size as to fit snugly and be held frictionally upon the nipples or bosses 13, 14. The outer annulus 23 is movable with reference to the inner annulus, but is frictionally engaged and held against rotation by the cap 30.

The end plates 11, 12, are attached to the cylinder 10 in any suitable manner, the preferred construction, however, being that shown, the diameter of the plates being such that they will fit snugly within the ends of the cylinder which are apertured, as shown at 19, to receive radial lugs 20 on the plates, the length of these lugs being substantially equal to the thickness of the cylinder wall so that their ends are flush with the outer surface thereof. The recesses 19 are of greater depth than the thickness of the plates, and after the latter are inserted the ends of the cylinder are flanged inwardly, as shown at 21, to overlap the plates and securely lock them in place.

An annular outstanding rib 24 is formed up on the end plate 11, or 12, its internal diameter being such that it receives the rim of the cap 30. The parts being thus assembled, a rigid pulley is formed, the end plates, even though of comparatively light sheet metal, being bound together by the rod 18.

The pulley thus constructed is preferably mounted in a U-shaped supporting bracket 25, which may be made of sheet metal and is capable of being attached by suitable bolts, not shown, to the framework in connection with which the pulley is to be employed. The ends of the arms of the bracket 25 are longitudinally recessed, as shown at 26, and the ball bearing caps 30 are each provided with a circumferential groove 27 for receiving the edges of this recess, thereby securely holding the pulley within the bracket and also, through the medium of the rod 18, locking the arms of the bracket together.

The pulley thus formed, while being cheap of construction, is light, yet possesses ample strength; and its ends being closed the accumulation of rubbish within its interior is prevented. Furthermore, the pulley itself contributes to the rigidity of the supporting bracket, rendering it possible to construct the latter of light material. The device as a whole is thus peculiarly well adapted to serve as a unit in the belt conveyer mechanism which forms the subject of an application Serial No. 663,954, for Letters Patent, made by Wiley W. Stephens.

While the preferred construction is herein shown and described, various details may be modified in form without departing from the scope of the invention.

I claim as my invention—

1. In combination, a pair of longitudinally slotted bracket arms, a pulley having centrally apertured end members, ball bearings surrounding the apertures of the pulley ends, a rod located on the axis of the pulley and projecting beyond the bearings, and laterally channeled heads on the rods fitting within the bracket slots.

2. In combination, a bracket hanger having longitudinally slotted parallel arms, a pulley having centrally apertured end members, ball bearings surrounding the apertures of the pulley ends, a rod located on the axis of the pulley and projecting beyond the bearings, and laterally channeled heads on the rods fitting within the bracket slots.

3. In combination, a pair of longitudinally slotted bracket arms, a pulley having centrally apertured end members, and a rod extending axially through the pulley, the ends of the rod projecting beyond the pulley ends and being provided with laterally recessed parts to fit within the slots of the bracket arms for rigidly connecting said arms.

4. In combination, a pair of longitudinally slotted bracket arms, a rod having laterally recessed ends fitting within the slots of the bracket arms for rigidly connecting said arms and a pulley turning on the rod between the bracket arms.

JOHN STEWART.

Witnesses:
C. A. KRAUSE,
O. P. CALKINS.